United States Patent [19]

Sevastakis

[11] 4,151,765
[45] May 1, 1979

[54] METHOD AND APPARATUS FOR FORMING MATCHING TAPERED SURFACES ON INTERFITTING MALE AND FEMALE PARTS

[76] Inventor: Gus Sevastakis, 5645 Angola Rd., Toledo, Ohio 43615

[21] Appl. No.: 857,238

[22] Filed: Dec. 5, 1977

[51] Int. Cl.$^2$ ............................ B23B 1/00; B23B 5/38
[52] U.S. Cl. ...................................... 82/1 C; 82/2 R; 82/15
[58] Field of Search ..................... 82/15, 16, 17, 1.4, 82/1 C, 31, 2 R

[56] References Cited
FOREIGN PATENT DOCUMENTS

| 311826 | 6/1917 | Fed. Rep. of Germany | 82/15 |
| 845592 | 8/1952 | Fed. Rep. of Germany | 82/15 |
| 859847 | 12/1952 | Fed. Rep. of Germany | 82/15 |

Primary Examiner—Leonidas Vlachos
Attorney, Agent, or Firm—William E. Mouzavires

[57] ABSTRACT

Matching tapered surfaces are cut on male and female parts to be interfitted along the tapered surfaces by utilizing a lathe, having a motor driven tail stock opposite a conventional head stock, with the tail stock being mounted relative to the bed of the lathe for adjustable movement to position the tail stock at a desired taper angle relative to the longitudinal centerline of the lathe. The tail stock is equipped with a "direct mounting" chuck having jaws for holding the parts during the taper cutting operation. In one operation, the male part, which is hollow, is gripped internally thereof by the tail stock chuck, and the taper is cut on the external surface of the part by movement of the cutting tool in a horizontal plane parallel to the centerline of the lathe. Since the tail stock has been preset at the desired tapered angle, the external surface of the male part will be cut with the desired taper. The male part is then removed from the chuck and then the female part is mounted on the chuck of the tail stock by engaging the jaws of the chuck on the external surface of the female part. The cutting tool is then moved in a horizontal plane to enter the internal passage of the female part and to cut the taper along the internal surface thereof. Since the angular setting of the tail stock remains the same as that previously set for cutting the male part, the internal taper cut on the female part will exactly correspond to the male part so that when these parts are ultimately fitted together, there should be substantial contact between the tapered surfaces thereof.

6 Claims, 4 Drawing Figures

METHOD AND APPARATUS FOR FORMING MATCHING TAPERED SURFACES ON INTERFITTING MALE AND FEMALE PARTS

BACKGROUND OF INVENTION

In the art of continuous vertical casting of solid or tubular bar products, it is now conventional to provide the external surface of one of the casting dies with a taper and to seat the die in a cooler assembly which has a tapered internal passage receiving the tapered surface of the die. Such an assembly, for example, is shown in my U.S. Pat. No. 4,000,773, issued Jan. 4, 1977 and entitled "Die Assembly For Continuous Vertical Casting Of Tubular Metallic Products." The function of the cooler assembly is to withdraw heat from the die which is subjected to extremely high temperatures from the molten material being utilized to form the casting. In order to obtain maximum heat transfer between the cooling assembly and the die, it is exceedingly important that the engaging tapered surfaces of these parts be in continuous and complete contact with each other. The problem presented by the latter objective is to provide matching or complementary tapers on the outer surface of the die and the inner surface of the cooler. Heretofore, this has been accomplished by cutting the tapered surfaces on a lathe and, to do this, it has been necessary to twice set the lathe cutting tool at an angle prior to cutting the tapers on the two parts. This not only slows down the taper cutting process but furthermore subjects the operation to the risk of cutting tapers on the parts which do not exactly correspond. The latter can result in insufficient heat transfer between the die and the cooler which could cause failure of the die. Since the dies are made from relatively expensive material, premature replacement is costly. In addition, replacement of the dies slows down the casting operation and, in turn, slows down production.

The present invention seeks to avoid the above noted problem by providing novel and improved method and apparatus for cutting exactly matching tapers on interfitting male and female parts so as to ensure, when the parts are interfitted, there will be substantially complete and continuous contact throughout the tapered surfaces thereof. While the present invention is particularly suitable for use in cutting tapered surfaces on a hollow die and a cooler sleeve which receives the die, the present invention will no doubt have applicability elsewhere in situations where exactly corresponding tapers are desired on interfitting male and female parts or in other situations where complementary or matching tapered surfaces are desired.

OBJECTS OF THE PRESENT INVENTION

It is a primary object of the present invention to provide novel method and apparatus for cutting exactly matching or complementary tapers on male and female parts to be interfitted along their tapered surfaces. Although the present invention is particularly suitable for cutting matching or complementary tapers on a die for continuous vertical casting and an associated cooling sleeve which receives the die, the present invention may well have applicability elsewhere.

Another object of the present invention is to provide such method and apparatus as mentioned above, which utilizes a lathe and a cutting tool positioned on the lathe at a desired taper angle and which position of the cutting tool is the same for cutting the tapered surfaces on both of the male and female parts.

A further object of the present invention is to provide certain improvements to a lathe which will permit identical but complementary tapers to be cut on male and female parts to be interfitted along their tapered surfaces, with an extremely high degree of accuracy and efficiency and without requiring any special skills from the lathe operator.

SUMMARY OF INVENTION

In accordance with one preferred method and apparatus of the present invention, a conventional lathe is provided with a tail stock which, according to the invention, is mounted on a swivel relative to the lathe bed so as to permit the tail stock to be set at a desired taper angle relative to the longitudinal centerline of the lathe. The tail stock is provided with a "direct mounting" chuck having multiple jaws which may engage a workpiece externally of the workpiece or internally of the workpiece when the workpiece is a hollow member or sleeve. In accordance with the invention, the tail stock is also provided with a suitable motor, for example, an electric motor, for operating the tail stock drive shaft to which the tail stock chuck is suitably keyed to rotate therewith. In order to cut matching tapers on male and female parts, both of which are sleeve-like members, the tail stock is adjusted to a desired tapered angle relative to the longitudinal centerline of the lathe; the taper angle corresponding to the angle of the taper to be cut on the parts. One of the parts is then mounted to the chuck of the tail stock and, assuming this part is a male part, the jaws of the chuck extend into the passage of the male part and grip the internal surfaces thereof to hold the part at the desired taper angle. The tool carriage of the lathe and the cross slide and the compound slide thereof which support the cutting tool, are then adjusted to bring the cutting tool into the proper position relative to the external surface of the male part to be cut with the taper. The male part is then rotated by energizing the motor associated with the tail stock, and the cutting tool is then moved horizontally along a horizontal path parallel to the centerline of the chuck to cut the desired taper into the external surface of the male part. Upon completion of the tapered surface, the male part is removed from the chuck of the tail stock, and the female part is then mounted in the chuck by engaging the chuck jaws with the external surface of the female part and without changing the angular setting of the tail stock relative to the longitudinal centerline of the lathe. Without changing the angular setting of the cutting tool relative to the longitudinal centerline of the lathe, the cross slide is moved transversely relative to the longitudinal centerline of the lathe to position the cutting tool within the hollow passage of the female part. The tail stock motor is then energized to rotate the female part, but in a direction opposite that in which the male part was driven; and the cutting tool is then moved horizontally along the bed of the lathe to cut a taper along the internal surface of the female part. The resulting tapered surface cut on the female part will be at the exact same angle as the tapered surface cut on the male part, however, these surfaces will be complementary to each other so that these parts will interfit, one within the other, along the cut tapered surfaces thereof.

DRAWINGS

The above and other objects of the present invention will become more apparent from the following detailed description taken in conjunction with the drawings in which.

DETAILED DESCRIPTION

Figure 1:
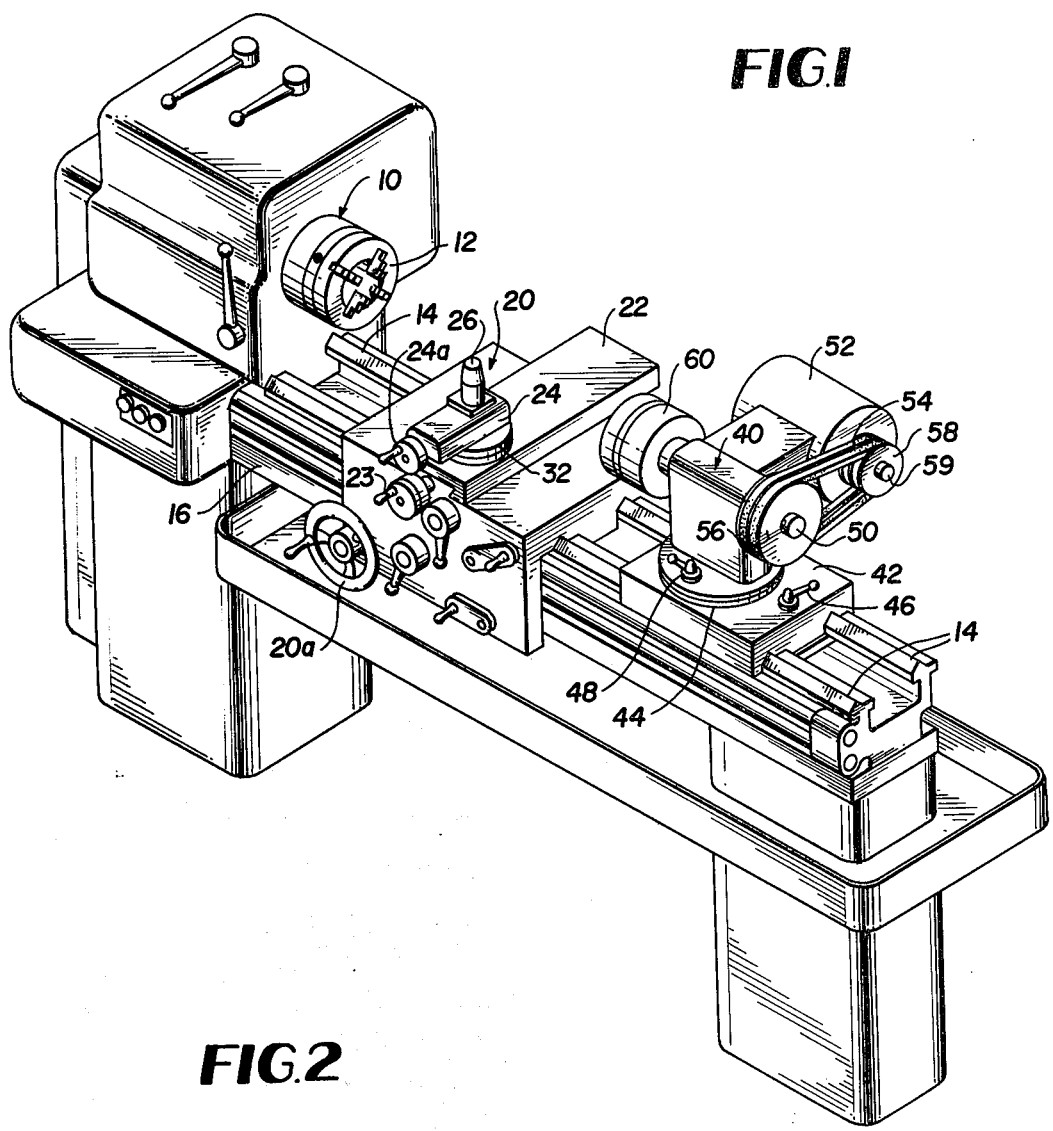
FIG. 1 is a perspective view of a lathe incorporating improvements in accordance with the present invention.
Figure 3:
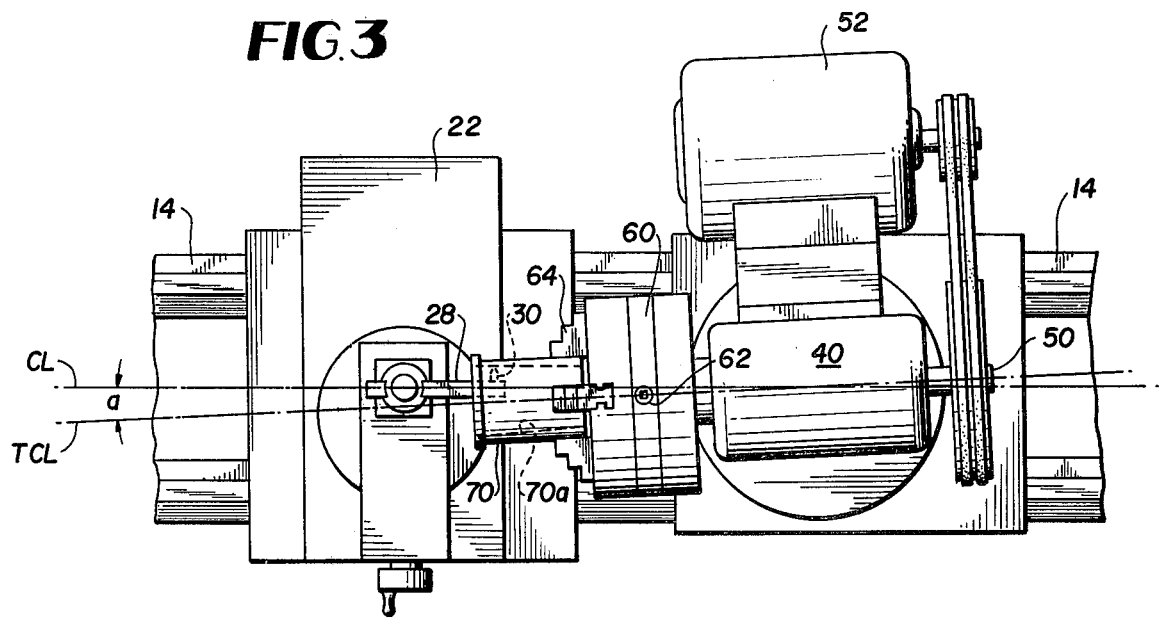
FIG. 3 is a fragmental, plan view of the right-hand portion of the lathe shown while cutting a taper along the internal surface of the female part in accordance with the present invention.
Figure 4:
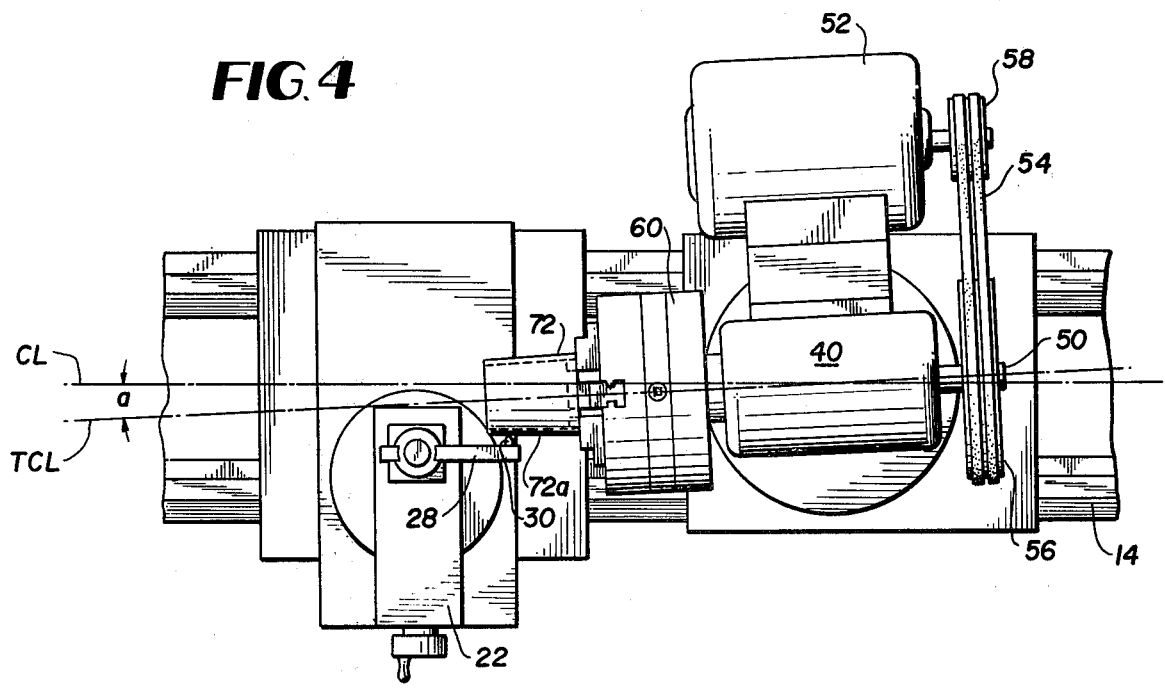
FIG. 4 is a view similar to FIG. 3 but showing the lathe while cutting a taper on the external surface of the male part which is to be interfitted within the female part as partly illustrated in FIG. 3.

Referring now to the drawings in detail, there is shown in FIG. 1 for illustrative purposes only, a lathe having a conventional head stock generally designated 10 including a direct mounting multiple-jaw chuck 12 and a bed 16 on which there is fixed bed rails 14 slidably receiving and guiding a carriage generally designated 20. Carriage 20 carries a cross slide 22 which is movable transversely over the bed guide rails 14 relative to carriage 20 by manipulation of hand wheel 23. Mounted on cross slide 22 through means of a swivel 32, is a compound slide 24 including a tool post 26 for receiving and supporting, in a desired adjusted fixed position, a tool mounting bar 28 which is capable of holding a cutting tool 30 as shown in FIGS. 3 and 4. The angular position of the cutting tool 30 and its associated tool mounting bar 28 relative to the centerline CL (see FIGS. 3 and 4) of the lathe is achieved by the swivel mounting 32 of the compound slide 24. The feeding of the cutting tool 30 into or out of a workpiece is achieved by movement of the compound slide 24 relative to the cross slide 22, which movement is controlled by a hand wheel 24a as is well-known and conventional. The horizontal position of the carriage 20 along the bed guide rails 14 is, of course, achieved by manipulation of hand wheel 20a. The features of the lathe described above are well-known and conventional in the art and need no further description.

In accordance with the present invention, a novel improvement in the tail stock, which is generally designated 40, of the lathe is provided. This improvement includes the mounting of the tail stock 40 on a base 42 by means of a swivel assembly 44 which is movable about a vertical axis to adjust the tail stock to provide a desired taper angle as will be further described. Tail stock 40 further includes a chuck driving shaft 50 which, in accordance with the improvement of the present invention, is driven by a motor which may be any suitable variable speed, reversible electric motor such as that generally designated 52, through a pulley belt 54 operating on pulleys 56 and 58. Although, not shown, a motor with a variable speed and reversible gear transmissions may be utilized to power chuck driving shaft 50 in place of the motor 52 described.

By adjusting swivel 44 about a vertical axis, the angle of the chuck driving shaft 50 of the tail stock may be set to provide a desired taper angle. After adjustment, the swivel 44 may be locked in the set position by means of any suitable lock mechanism such as locking screws 48. The position of the tail stock along the bed is achieved by sliding the base 42 along the bed guide rails 14 and then by locking the base 42 in the desired set position by means of a locking screw 46. Although, not shown, base 42 may be made in two parts, one part being fixed to the guide rails in the desired position and the other part angularly adjustable relative to the first part to set the desired taper angle of the chuck drive shaft 50.

Further in accordance with the present invention, the tail stock 40 is provided with a multiple jaw direct mounting chuck 60 mounted to the shaft 50 to rotate therewith. Chuck 60 may be a conventional chuck similar to the head stock chuck 12 having a plurality of workpiece holding jaws 64, which have a stepped configuration to permit them to grip an internal surface of a hollow part or sleeve in addition to external surfaces. Chuck 60 may be fixed to shaft 50 to rotate therewith in any suitable manner such as by a set screw, access to which, may be provided by a key passage 62 shown in FIG. 3. When the center of the tail stock chuck 60 is aligned with the center of head stock chuck 12, a line drawn between the centers will be termed herein as "centerline CL of the lathe" and which centerline CL will be parallel to the bed guide rails 14. When it is desired to hold in chuck 60, a workpiece or part at an angle a (see FIGS. 3 and 4) relative to centerline CL, the locking screw 48 is loosened to free swivel assembly 44 after which the tail stock may be adjusted about a vertical axis to place the centerline of chuck 60 at angle a relative to the centerline CL of the lathe. Locking screw 48 may then be tightened to fix the tail stock at this desired taper angle.

Figure 2:
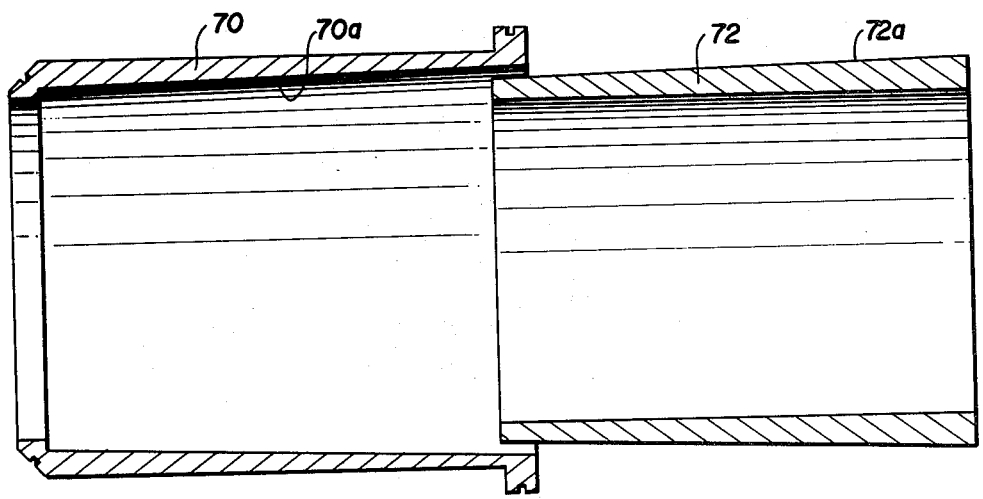
FIG. 2 is an assembly view of male and female parts, shown in longitudinal cross section, having complementary tapered surfaces formed in accordance with the present invention.

Referring to FIG. 2, the present invention may be utilized to cut an internal tapered surface 70a of a hollow female part or sleeve 70 and an external tapered surface 72a on a hollow or sleeve-like male part 72, with the tapered surfaces 70a and 72a having the same tapered angle but being complementary to each other so that the male part 72 may be inserted within the female part 70 with the tapered surfaces 70a and 72a engaging each other throughout. Female part 70 may be a sleeve utilized in a cooler assembly, while male part 72 may be a die, such as described above and shown in my aforementioned patent.

Referring now to FIGS. 3 and 4 and initially to FIG. 3, tapered surfaces 70a and 72a may be cut by first mounting female part 70 in the tail stock chuck 60 with the jaws 64 of the chuck engaging the external surface of the female part 70 as shown in FIG. 3. Either prior or subsequent to the latter, the tail stock 40 is adjusted to set the centerline of the chuck 60 at an angle a relative to the centerline CL of the lathe; the angle a corresponding to the desired angle of the taper to be cut on the surfaces of the parts. The carriage 20, including the cross slide 22 and the compound slide 24, may then be adjusted to position the cutting tool 30 within the passage of the female part 70 as shown in FIG. 3. Motor 52 may then be energized to rotate workpiece 70 whereupon the lathe operator may begin to cut the taper on the internal surface 70a of female part 70 by moving the cutting tool 30 in a horizontal plane and along a path parallel to the centerline CL of the lathe. Since the female part 70 is positioned at the tapered angle a, the internal surface 70a of part 70 will be cut at the tapered angle a.

Upon completion of the cutting of the tapered surface 70a in part 70, the latter is removed from chuck 60 and the male part 70 is then mounted within the chuck jaws 64 as shown in FIG. 4. The cross slide 22 and the compound slide 24 are then adjusted to bring cutting tool 30 to the external surface 72a of the male part 72 but without changing the angular position of cutting tool 30 relative to the centerline CL of the lathe. External surface 72a may then be cut at the same tapered angle a but with the male part driven in the opposite direction in which the female part was driven. The resulting tapered surface 70a and 72a will be exactly complementary to each other, both possessing the same taper angle a so that these parts may be interfitted with substantial continuous and complete contact throughout the tapered surfaces. Although in the above description, the internal tapered surface 70a of female part 70 was first cut, it should be apparent that the external surface 72a of the male part 70 may be first cut and after which the internal surface 70a of the female part 70 may be cut. Furthermore, although the specific male part 72 described above is hollow, it will be understood that the present invention may be applied to other types of male parts which are not hollow or which do not have internal passages. Moreover, although the term "tail stock" has been used herein to generally designate the improvements of the present invention, the latter should not be confused with conventional tail stocks which do not provide the utility and advantages of the present invention.

It will be seen from the above that the present invention provides a unique way of efficiently cutting highly accurate tapered surfaces on mating male and female parts. Moreover, the improvements of the present invention may be applied to conventional lathes or similar machines without substantial investment expense.

What is claimed is:

1. A method of forming matching tapered surfaces on male and female parts to be interfitted one within the other along the complementary tapered surfaces thereof, the method comprising the steps of; mounting the female part on the chuck of a lathe with the chuck axis extending at an angle to a longitudinal centerline of the lathe, cutting the internal surface of the female part to provide a tapered surface by moving a cutting tool of the lathe within a passage of the female part along a line parallel to the centerline of the lathe, removing the female part from the chuck, mounting the male part of the chuck without changing the angular position of the chuck relative to the centerline of the lathe, and without changing the angular position of the cutting tool relative to the centerline of the lathe, cutting the external surface of the male part by moving the same cutting tool of the lathe along a path parallel to the centerline of the lathe, and wherein the rotation of the chuck and the male part held therein during the cutting of the taper on the male part is reversed relative to the rotation of the chuck and the female part during the cutting of the taper on the female part.

2. The method defined in claim 1 including the step of gripping the female part with the chuck by engaging an external surface portion of the female part with jaws of the chuck.

3. The method defined in claim 2 applied to a male part having an internal passage, the method further comprising the step of gripping the male part with the chuck by engaging internal surfaces of the male part within the passage of the male part with the jaws of the chuck.

4. The method defined in claim 1 wherein there is utilized a lathe having a motor driven tail stock including said chuck and which is capable of adjustment about a vertical axis to position the parts at said angle relative to said centerline of the lathe.

5. The method defined in claim 1 wherein the female part is a sleeve to be included in a cooler assembly for a die and wherein the male part is a hollow die used in continuous vertical casting of bar products.

6. In a lathe having a longitudinal centerline and a head stock for driving a chuck to be mounted to the head stock with the chuck rotatable about said centerline of the lathe, a bed having guide rails parallel to the centerline of the lathe, and a tool carriage mounted on the guide rails of the bed and having means for mounting a cutting tool relative to the carriage in a desired position relative to the centerline of the lathe; the improvement comprising a tail stock having a rotatable chuck driving shaft extending in a horiztonal plane, means mounting the tail stock on the bed rails of the lathe for adjustable movement about a vertical axis to place said shaft at a desired angle relative to the centerline of the lathe, and means including a reversible variable speed motor for driving the shaft in rotation for driving a chuck to be mounted on the shaft, means for moving the tail stock along the bed into any one of a plurality of preselected positions, said tail stock including a base mounted to said guide rails of the bed, and a swivel mounted on the base for rotating the tail stock about a vertical axis relative to said base, and means for locking the swivel in an adjusted rotated position.

* * * * *